United States Patent
Nerl et al.

(10) Patent No.: US 7,313,749 B2
(45) Date of Patent: Dec. 25, 2007

(54) SYSTEM AND METHOD FOR APPLYING ERROR CORRECTION CODE (ECC) ERASURE MODE AND CLEARING RECORDED INFORMATION FROM A PAGE DEALLOCATION TABLE

(75) Inventors: John A. Nerl, Londonderry, NH (US); Ken Pomaranski, Roseville, CA (US); Gary Gostin, Plano, TX (US); Andrew Walton, Rocklin, CA (US); David Soper, Murphy, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 585 days.

(21) Appl. No.: 10/879,643

(22) Filed: Jun. 29, 2004

(65) Prior Publication Data

US 2005/0289402 A1    Dec. 29, 2005

(51) Int. Cl.
*G11C 29/00* (2006.01)
(52) U.S. Cl. .................................................. 714/764
(58) Field of Classification Search ................ 714/764, 714/763, 746
See application file for complete search history.

(56) References Cited

U.S. PATENT DOCUMENTS 4,475,194 A * 10/1984 LaVallee et al. ............ 714/710
7,058,782 B2 * 6/2006 Henderson et al. ......... 711/170

OTHER PUBLICATIONS

Chen et al., Fault tolerant memory simulator, Mar. 1984, IMB J. Res. Develop. vol. 28, No. 2, pp. 184-195, retreived from google Feb. 28, 2007.*
S. Kaneda and E. Fujiwara; "Single Byte Error Correcting-Double Byte Error Detecting Codes For Memory Systems," IEEE Transactions on Computers, vol. C-31, No. 7, Jul. 1982.

* cited by examiner

*Primary Examiner*—Shelly Chase

(57) ABSTRACT

A system utilizing an erasure mode in an error correction code algorithm is described that includes non-volatile memory storing a page deallocation table. A memory controller stores and retrieves data from a memory subsystem, and uses an error correction code algorithm to correct data corruption in retrieved data. An error analysis algorithm executed in a processor records instances of data corruption in the page deallocation tables and deallocates memory regions associated with multiple occurrences of data corruption at single bit locations. The error analysis algorithm further causes the memory controller to apply an erasure mode of the error correction code algorithm upon detection of a repeated pattern of data corruption across different addresses of the memory subsystem, and removes entries in the page deallocation table that correspond to data corruption addressed by application of the erasure mode.

20 Claims, 4 Drawing Sheets

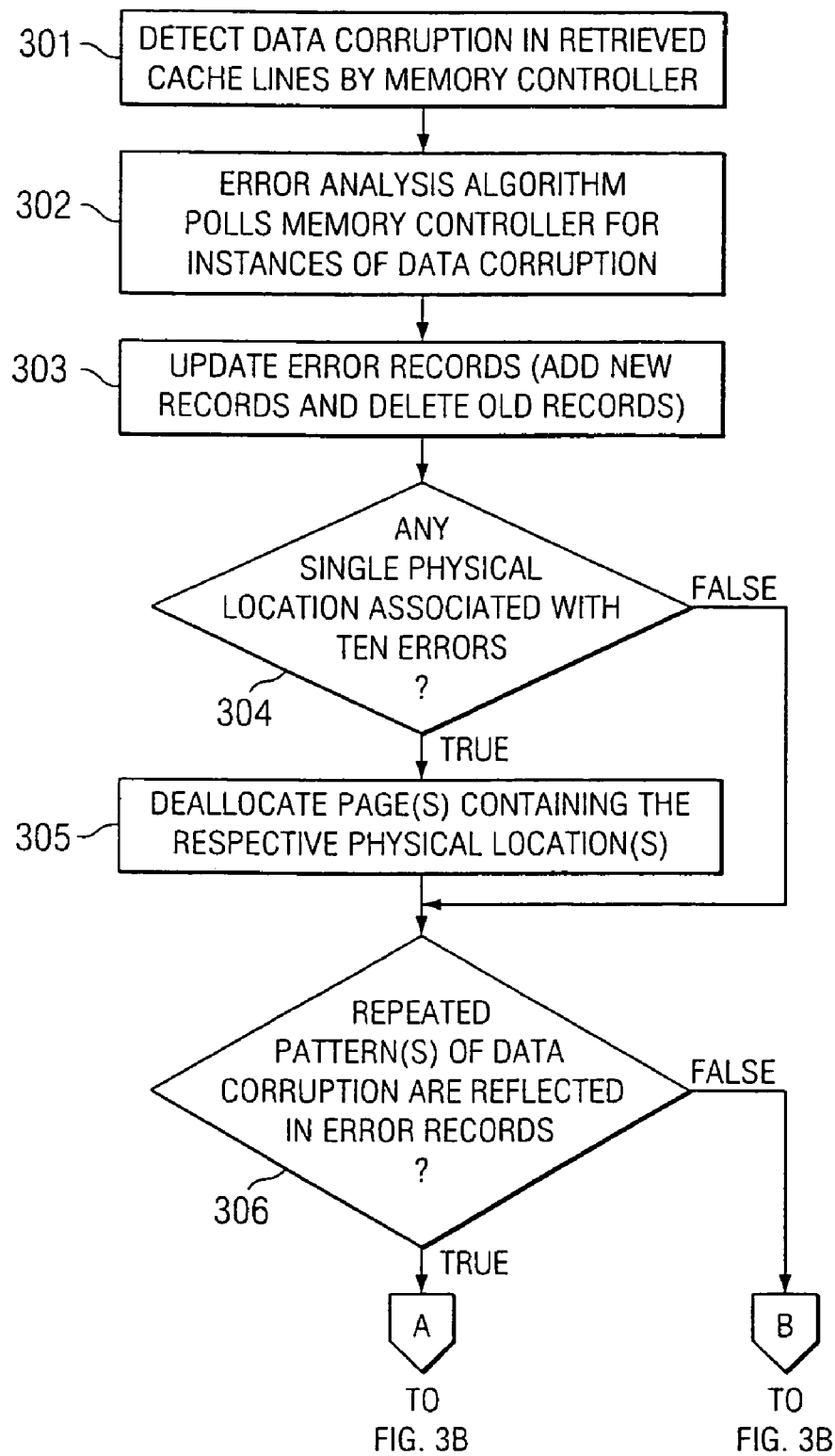

SYSTEM AND METHOD FOR APPLYING ERROR CORRECTION CODE (ECC) ERASURE MODE AND CLEARING RECORDED INFORMATION FROM A PAGE DEALLOCATION TABLE

CROSS-REFERENCE TO RELATED APPLICATION(S)

The present application is related to U.S. patent application Ser. No. 10/435,150, filed May 9, 2003, entitled "SYSTEMS AND METHODS FOR PROCESSING AN ERROR CORRECTION CODE WORD FOR STORAGE IN MEMORY COMPONENTS," which is incorporated herein by reference; this application is also related to concurrently filed and commonly assigned U.S. patent application Ser. No. 10/879,262, entitled "SYSTEM AND METHOD FOR CONTROLLING APPLICATION OF AN ERROR CORRECTION CODE (ECC) ALGORITHM IN A MEMORY SUBSYSTEM," and U.S. patent application Ser. No. 10/879,255, entitled "SYSTEM AND METHOD FOR CONTROLLING APPLICATION OF AN ERROR CORRECTION CODE (ECC) ALGORITHM IN A MEMORY SUBSYSTEM," which are incorporated herein by reference.

BACKGROUND

Electronic data storage utilizing commonly available memories (such as dynamic random access memory (DRAM)) can be problematic. Specifically, there is a probability that, when data is stored in memory and subsequently retrieved, the retrieved data will suffer some corruption. For example, DRAM stores information in relatively small capacitors that may suffer a transient corruption due to a variety of mechanisms. Additionally, data corruption may occur as the result of hardware failures such as loose memory modules, blown chips, wiring defects, and/or the like. The errors caused by such failures are referred to as repeatable errors, since the same physical mechanism repeatedly causes the same pattern of data corruption.

A variety of error detection and error correction mechanisms have been developed to mitigate the effects of data corruption. For example, error detection and correction algorithms may be embedded in a number of components in a computer system to address data corruption. Frequently, ECC algorithms are embedded in memory controllers such as coherent memory controllers in distributed shared memory architectures.

In general, error detection algorithms employ redundant data added to a string of data. The redundant data is calculated utilizing a check-sum or cyclic redundancy check (CRC) operation. When the string of data and the original redundant data is retrieved, the redundant data is recalculated utilizing the retrieved data. If the recalculated redundant data does not match the original redundant data, data corruption in the retrieved data is detected.

Error correction code (ECC) algorithms operate in a manner similar to error detection algorithms. When data is stored, redundant data is calculated and stored in association with the data. When the data and the redundant data are subsequently retrieved, the redundant data is recalculated and compared to the retrieved redundant data. When an error is detected (e.g, the original and recalculated redundant data do not match), the original and recalculated redundant data may be used to correct certain categories of errors. An example of a known ECC scheme is described in "Single Byte Error Correcting-Double Byte Error Detecting Codes for Memory subsystems" by Shigeo Kaneda and Eiji Fujiwara, published in IEEE TRANSACTIONS on COMPUTERS, Vol. C31, No. 7, July 1982.

SUMMARY

In one embodiment, a system comprises non-volatile memory storing a page deallocation table (PDT), a memory controller for storing and retrieving data from a memory subsystem, the memory controller using an error correction code (ECC) algorithm to correct data corruption in retrieved data, a processor for executing an error analysis algorithm, the error analysis algorithm recording instances of data corruption in the PDT, deallocating memory regions associated with multiple occurrences of data corruption at single bit locations, the error analysis algorithm causing the memory controller to apply an erasure mode of the ECC algorithm upon detection of a repeated pattern of data corruption across different addresses of the memory subsystem, and removing entries in the PDT that correspond to data corruption addressed by application of the erasure mode.

In another embodiment, a method comprises detecting data corruption in data retrieved from a memory subsystem, identifying bit locations associated with multiple occurrences of data corruption, deallocating memory pages containing the identified bit locations using a page deallocation table (PDT), attempting to detect a repeated pattern of data corruption across a domain of the memory subsystem, when a repeated pattern of data corruption is detected, invoking an erasure mode of error correction code (ECC) processing to address the repeated pattern of data corruption in the domain, and removing entries from the PDT that are addressed by the erased repeated pattern.

In another embodiment, a system comprises means for recording information related to data corruption detected during retrieval of cache lines from a memory subsystem, means for analyzing the recorded information related to the data corruption to identify multiple occurrences of data corruption at respective bit locations within the memory subsystem, means for deallocating a memory region in response to the means for analyzing, means for detecting a repeated pattern of data corruption across different addresses in the memory subsystem, means for activating an erasure mode of a memory controller in response to the means for detecting, and means for clearing recorded information related to data corruption addressed by the erasure mode in response to the means for activating.

BRIEF DESCRIPTION OF THE DRAWINGS

FIGS. 3A and 3B depict a flowchart for analyzing and responding to data corruption according to one representative embodiment.

DETAILED DESCRIPTION

Figure 1:
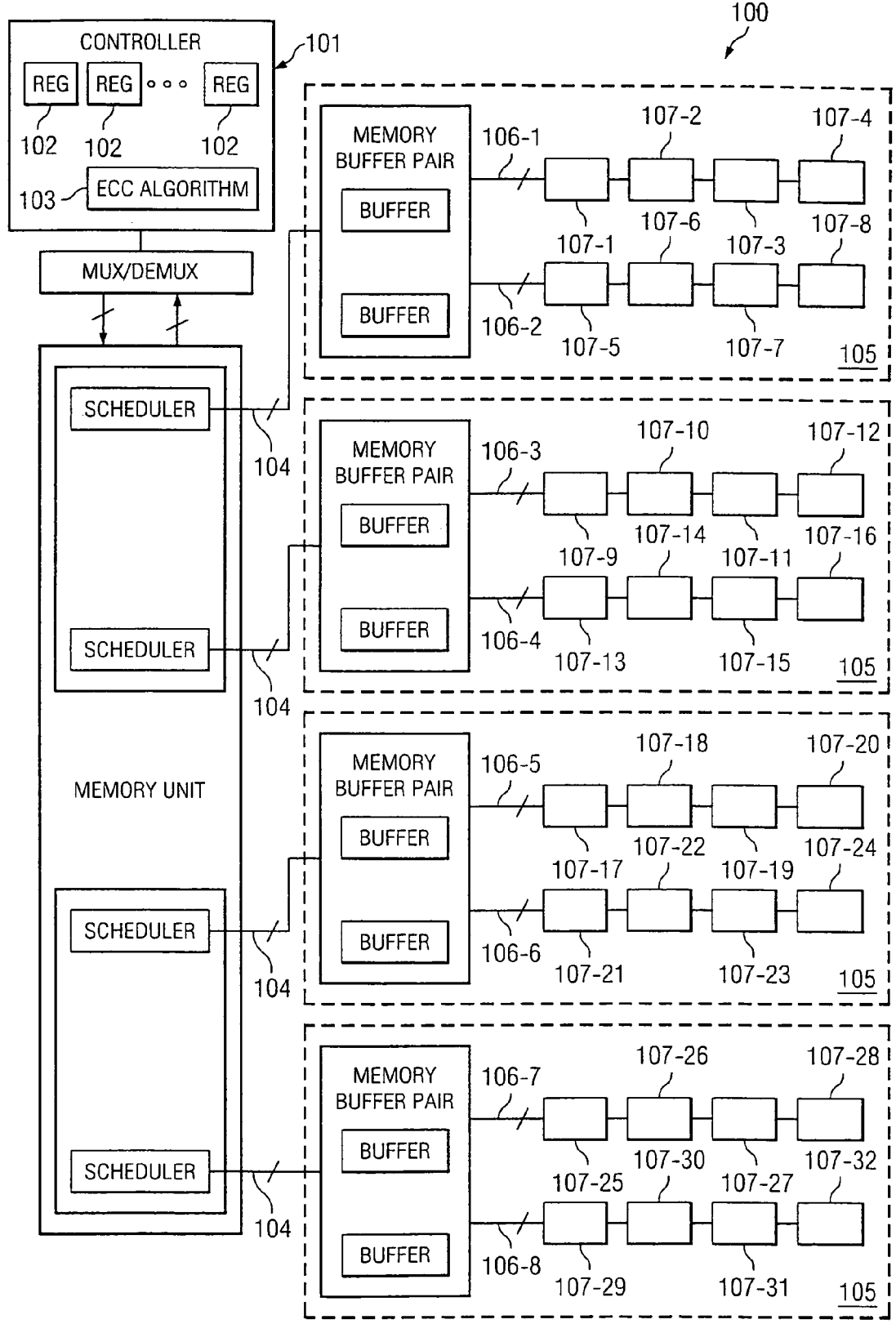
FIG. 1 depicts a memory subsystem that performs data storage using a selectively enabled erasure mode according to one representative embodiment.

Some embodiments of the present invention are directed to employing an ECC algorithm within a memory subsystem to provide increased reliability of the memory subsystem. In one representative embodiment, the ECC algorithm enables multiple "single-byte" errors to be corrected within a single cache line. A single-byte error refers to corruption of any number of bits within eight adjacent bits of a cache line aligned according to eight-bit boundaries. The correctable errors may be transient single-byte errors. Moreover, some representative embodiments enable correction of repeatable errors within a single cache line in addition to the correction of transient errors. The repeatable errors may be caused by a failing DRAM part, a memory interconnect malfunction, a memory interface logic malfunction, and/or the like. The correction of a repeatable error occurs according to an "erasure" mode. "Erasing" refers to decoding an ECC code word by assuming that an identified bit or bits are corrupted. The erasure mode is activated by loading a register in a memory controller with a suitable value to identify the location of the repeatable error.

When the erasure mode is activated, performance issues are raised. The additional processing associated with the erasure mode causes memory transactions to consume additional time. Also, the probability of decoding an uncorrectable error as correctable is increased due to the mathematical properties of the ECC algorithm. Even though the increased probability is relatively small, the probability is not insignificant in relatively large memory subsystems.

To address the performance issues associated with the erasure mode, some representative embodiments employ memory deallocation operations to address occurrences of data corruption in addition to erasure mode processing. Memory deallocation may occur using memory page constructs. A memory page refers to a contiguous block of memory addresses for which a virtual to physical mapping can be created by an operating system. In this context, "virtual" refers to the central processing unit (CPU) visibility of the memory and "physical" refers to the hardware visibility of the memory. A change in the mapping enables a new block of physical memory to be substituted for a failing block of physical memory without affecting the view of the virtual addresses as seen by the CPU. When multiple errors are observed at the same physical address at the bit level over an appropriate time frame, the page containing that physical address is deallocated according to representative embodiments. Specifically, within the given time frame, the probability of multiple transient errors occurring at the same physical bit or bits is very low. Accordingly, it can be inferred that the observation of multiple errors results from a hardware issue. Page deallocation will prevent additional memory transactions from occurring using the potentially defective hardware component(s). By preventing use of the potentially defective memory addresses in an efficient manner, the probability of an unrecoverable error occurring during the retrieval of a cache line is reduced.

If a repeatable error is limited to a specific address or small number of addresses, page deallocation remedies the hardware issue in an efficient manner. Moreover, page deallocation does not invoke the performance limitations associated with the erasure mode processing. However, if a repeatable error is associated with a memory component (e.g., a bus or a memory rank) that is common to a larger number of addresses, page deallocation is problematic. Specifically, the amount of memory that is deallocated becomes quite large relatively quickly. Deallocated memory reduces the amount of memory available for supported CPU(s). Furthermore, deallocated memory may exceed the capacity of the operating system resources and other resources used to manage the deallocation functionality thereby causing the system to cease operations.

Some representative embodiments prevent page deallocation functionality from affecting system performance by efficiently invoking erasure mode processing using a suitable software algorithm. The software algorithm analyzes the occurrences of data corruption to identify repeated bit patterns. If a repeated bit pattern is identified, the software algorithm correlates the occurrence of data corruption to a particular "domain" (a particular level and/or a particular component) of the memory subsystem. If a sufficient number of occurrences of data corruption have been detected as originating from the particular domain according to the same pattern of data corruption, the software algorithm activates the erasure mode for the domain of the memory subsystem. Specifically, multiple occurrences of data corruption across a domain indicates that the underlying hardware issue is related to a higher-level memory component. Accordingly, the underlying hardware issue can be better remedied through application of the erasure mode processing. The software algorithm may activate the erasure mode by setting appropriate registers of the memory controller of the memory subsystem. The memory subsystem responds by decoding ECC code words from the domain of the memory subsystem by assuming that the identified bits within the ECC code words are corrupted. By decoding ECC code words in this manner, no further page deallocation operations will occur for the respective repeatable error.

In some embodiments, a page deallocation table is managed in association with activation of the erasure mode. For example, the page deallocation table may be implemented in system firmware to identify bit locations associated with multiple instances of data corruption. By identifying such locations in system firmware, the corresponding pages can be deallocated during system initialization operations before system software is loaded to enable access to a storage peripheral. To address the storage capacity limits associated with firmware, some embodiments remove entries from the page deallocation table upon activation of the erasure mode. Specifically, when an erasure mode is activated for a particular domain and a bit pattern, the page deallocation table is searched for bits corresponding to the bit pattern within the particular domain. If any entries are found, those entries are removed. There is no necessity of retaining those locations in the table, because the erasure mode will cause ECC code words to be decoded without utilizing the bits associated with multiple instances of data corruption. By managing a page deallocation table in this manner, a greater number of errors may be sustained before firmware resources are consumed thereby enabling system operations to continue.

Referring now to the drawings, FIG. 1 depicts memory subsystem 100 that performs data storage using a selectively enabled erasure mode according to one representative embodiment. Memory subsystem 100 includes memory controller 101 (e.g., a cache coherency controller). Memory controller 101 manages the storage and retrieval of cache lines to and from the hierarchical arrangement of memory components in memory subsystem 100. Specifically, memory subsystem 100 includes a plurality of memory quadrants 105 that are accessible by respective buses 104. As shown in FIG. 1, each memory quadrant 105 includes two DRAM buses 106 (shown collectively as 106-1 through 106-8) to enable access to eight memory ranks 107 (shown collectively as memory ranks 107-1 through 107-32). Each rank 107 includes a plurality of discrete DRAM banks (not shown) as well known in the art. The plurality of ranks 107 may be implemented by two dual-in-line memory modules (DIMMs). In one representative embodiment, a cache line is stored across a respective rank 107 to facilitate correction of single-byte errors.

Memory controller 101 includes ECC logic 103 to append ECC redundancy bits to cache lines during storage and to utilize the ECC redundancy bits to perform error detection and correction upon retrieval of cache lines. The ECC redundancy bits may be used to address transient errors. Also, the ECC redundancy bits may be used to address repeatable errors. Specifically, malfunctions of various components may cause repeatable errors for selected memory addresses and have no effect on other memory addresses. For example, a wire within DRAM bus 106-1 may exhibit intermittent failure. Cache lines retrieved from ranks 107-1 through 107-4 will exhibit, from time to time, a repeated error for the bit associated with the failing wire. However, cache lines retrieved from ranks 107-5 through 107-32 will not experience a corresponding error at the same bit location. Registers 102 of controller 101 are used by ECC logic 103 to apply the erasure mode of the ECC algorithm to data retrieved from the specific portion of memory subsystem 100 affected by a detected component failure. Hereinafter, the term "domain" shall be used to refer to any portion of the memory subsystem to which the erasure mode ECC processing may be applied independently of the remaining portion of the memory subsystem.

To correct repeatable errors according to an erasure mode in addition to transient errors, ECC logic 103 may utilize a suitable Reed-Solomon burst error correction code to perform single-byte correction. In Reed-Solomon algorithms, the code word consists of n m-bit numbers: $C=(c, c_{n-2}, \ldots, c_o)$. The code word may be represented mathematically by the following polynomial of degree n with the coefficients (symbols) being elements in the finite Galios field $(2^m)$: $C(x)=(cx^{n-1}+c_{n-2}x^{n-2}\ldots+c_o)$. The code word is generated utilizing a generator polynomial (typically denoted by g(x)). Specifically, the payload data (denoted by u(x)) is multiplied by the generator polynomial, i.e., $C(x)=x^{n-k}u(x)+[x^{n-k}u(x)\bmod(g(x))]$ for systematic coding. Systematic coding causes the original payload bits to appear explicitly in defined positions of the code word. The original payload bits are represented by $x^{n-k}u(x)$ and the redundancy information is represented by $[x^{n-k}u(x)\bmod(g(x))]$.

When the code word is subsequently retrieved from memory, the retrieved code word may suffer data corruption due to a transient failure and/or a repeatable failure. The retrieved code word is represented by the polynomial r(x). If r(x) includes data corruption, r(x) differs from C(x) by an error signal e(x). The redundancy information is recalculated from the retrieved code word. The original redundancy information as stored in memory and the newly calculated redundancy information are combined utilizing an exclusive-or (XOR) operation to form the syndrome polynomial s(x). The syndrome polynomial is also related to the error signal. Using this relationship, several algorithms may determine the error signal and thus correct the errors in the corrupted data represented by r(x). These techniques include error-locator polynomial determination, root finding for determining the positions of error(s), and error value determination for determining the correct bit-pattern of the error(s). For additional details related to recovery of the error signal e(x) from the syndrome s(x) according to Reed-Solomon burst error correction codes, the reader is referred to THE ART OF ERROR CORRECTING CODES by Robert H. Morelos-Zaragoza, pages 33-72 (2002), which is incorporated herein by reference.

Erasures in error correction codes are specific bits or specific strings of bits that are known to be potentially corrupted without resorting to the ECC functionality. For example, specific bits may be identified as being potentially corrupted due to a constant or intermittent hardware failure such as a malfunctioning DRAM component, a wire defect, and/or the like. Introduction of erasures into the ECC algorithm is advantageous, because the positions of the potentially corrupted bits are known. Let d represent the minimum distance of a code, v represent the number of errors, and μ represent the number of erasures contained in a received ECC code word. Then, the minimum Hamming distance between code words is reduced to at least d−μ in the non-erased portions. It follows that the error-correcting capability is [(d−μ−1)/2] and the following relation is maintained: d>2v+μ. Specifically, this inequality demonstrates that for a fixed minimum distance, it is twice as "easy" to correct an erasure as it is to correct a randomly positioned error.

In one representative embodiment, ECC logic 103 of memory controller 101 may implement the decoding procedure of a [36, 33, 4] shortened narrow-sense Reed-Solomon code (where the code word length is 36 symbols, the payload length is 33 symbols, and the Hamming distance is 4 bits) over the finite Galios field $(2^8)$. The finite Galios field defines the symbol length to be 8 bits. By adapting ECC logic 103 in this manner, the error correction may occur in two distinct modes. In a first mode, ECC logic 103 performs single-byte correction. In the second mode (the erasure mode), a byte location (or locations) is specified in the ECC code word as an erasure via a register setting. The location is identified by a software or firmware process as a repeatable error caused by a hardware failure. ECC logic 103 decodes the retrieved data by assuming that the single-byte associated with the identified erasure is corrupted. Because the minimum Hamming distance is reduced, ECC logic 103 enables the entire cache line to be recovered even when another (e.g., a transient) single-byte error is present in addition to the erasure error.

Additional details regarding a hardware implementation of the ECC algorithm employing a selectively enabled erasure mode in a memory subsystem may be found in U.S. patent application Ser. No. 10/435,150 entitled "SYSTEMS AND METHODS FOR PROCESSING AN ERROR CORRECTION CODE WORD FOR STORAGE IN MEMORY COMPONENTS."

Figure 2:
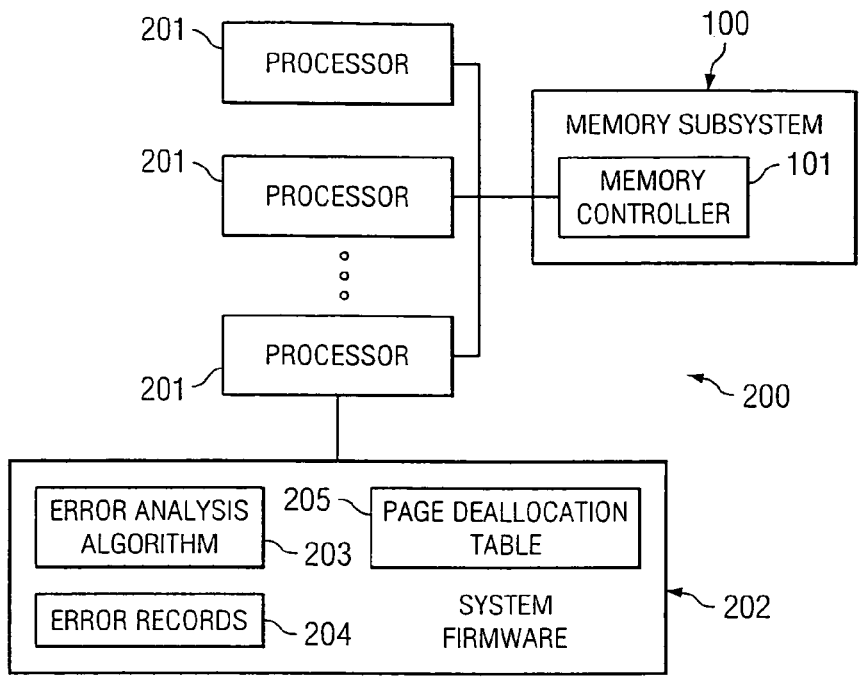
FIG. 2 depicts a computer system employing a software algorithm that records and analyzes memory errors to control the selective activation of erasure mode processing according to one representative embodiment.

Referring now to FIG. 2, computer system 200 employs page deallocation and erasure mode processing (using memory subsystem 100) in response to repeatable errors. Computer system 200 includes a plurality of processors 201 that store and retrieve cache lines using memory subsystem 100. When an occurrence of data corruption occurs upon the retrieval of a cache line, memory controller 101 detects the error and temporarily stores information related to the error (e.g., the physical memory address and corrupted bits/bytes). From time to time, error analysis algorithm 203 stored in system firmware 202 (or other suitable non-volatile memory or computer readable medium) is executed by a processor 201. Error analysis algorithm 203 polls memory controller 101 to obtain the information related to detected occurrences of data corruption. In response, error analysis algorithm 203 records the occurrences in error records 204. Error records 204 contain suitable information to enable repeated errors to be detected such as the bit location(s) exhibiting the error(s), the memory addresses of the error(s), the buses, the memory ranks, the DRAM banks used to communicate a corrupted cache line, and/or the like. Error records 204 may include page deallocation table 205.

If multiple errors are observed at the same memory location at the bit level, it may be inferred that the multiple errors are not transient errors. Specifically, the probability of multiple transient errors occurring at the same bit location within a limited time frame is quite low. Instead, it may be inferred that a hardware issue is the cause of the multiple errors. Accordingly, error analysis algorithm 203 causes the page containing the memory location to be deallocated. In response to the deallocation, the operating system (not shown) maps the virtual addresses associated with the deallocated page of memory to a new page of memory. The deallocated page becomes unavailable for software processes thereby preventing further errors associated with access of faulty hardware.

As additional errors occur, error analysis algorithm 203 analyzes the errors to determine whether detected repeatable errors are associated with hardware components associated with a larger range of addresses. Error analysis algorithm 203 detects whether repeatable errors according to the same repeated pattern of data corruption have occurred in a respective domain more than a threshold number of times. If so, an erasure mode is activated for the domain to correct the repeated pattern of data corruption. The erasure mode is activated by setting a respective register of memory controller 101 to erase the bits associated with the repeated pattern of data corruption. By activating the erasure mode in an efficient manner, unnecessary memory deallocation operations will not occur because the relevant repeatable errors will be corrected using the erasure mode of the ECC algorithm. Also, upon activation of the erasure mode, entries are removed from page deallocation table 205 that correspond to the bit pattern of the respective memory domain. The removal of entries from page deallocation table 205 enables a greater number of errors to occur before system resources are consumed.

The selection of threshold values used to control repeatable error handling may take into account a number of factors. For example, threshold values selected according to a predicted rate of transient data corruption will reduce undesired effects associated with memory deallocation operations and erasure mode ECC processing. The most frequent cause of transient data corruption is a particle strike. A particle strike involves the transfer of energy to a DRAM element thereby changing the state of the DRAM element and corrupting the bit associated with the DRAM element. DRAM vendors estimate that discrete DRAM elements exhibit an error rate of 5000 to 15000 failures in time (FIT), typically measured in billion device hours. Using 10,000 FIT as an average, a single DIMM can be expected to experience a transient error once every 114 days. In a memory subsystem with 32 DIMMs, approximately 100 errors can be expected per year. Accordingly, the observation of approximately 100 randomly occurring errors per year at random locations in a memory subsystem is not a cause for concern.

Some representative embodiments set a threshold value in an appropriate manner so that the occurrence of transient errors does not trigger page deallocation. In one representative embodiment, the threshold value is selected according to a defined observation period (e.g., twenty-four hours). That is, an expected number of transient errors is related to an observation period. The determination whether observed errors are indicative of transient errors or repeatable errors can be facilitated by defining a consistent observation period through appropriate deletion of old records. Also, the threshold value may be selected in reference to the amount of underlying memory. For the present discussion, it will be assumed that 32 DIMMs are used to implement the memory subsystem. A multiple value may be employed to enable differentiation between transient errors and repeatable errors. Specifically, if the observed number of errors exceeds the expected number of transient errors by an appropriate multiple (e.g., fifty), it may be concluded that an underlying hardware issue should be addressed. Given these considerations, if ten errors are detected within an observation period at the same physical bit location, the page containing that bit location is deallocated.

The selection of the threshold values for the erasure domains may be selected in a similar manner. Furthermore, the thresholds for various domains may be stepped to limit activation of the erasure mode processing to appropriate domains of the memory subsystem. In one representative embodiment, if ten repeatable errors having the same pattern of data corruption are observed for a domain associated with a memory bank, the erasure mode is activated for that memory bank. If twelve repeatable errors having the same pattern of data corruption are observed for a domain associated with a memory rank 107 (see FIG. 1), the erasure mode is activated for that memory rank. If fourteen repeatable errors having the same pattern of data corruption are observed for a domain associated with a DRAM bus 106, the erasure mode is activated for that memory DRAM bus. If sixteen repeatable errors having the same pattern of data corruption are observed for a domain associated with a quadrant bus 104, the erasure mode is activated for that memory quadrant bus.

Figure 3B:
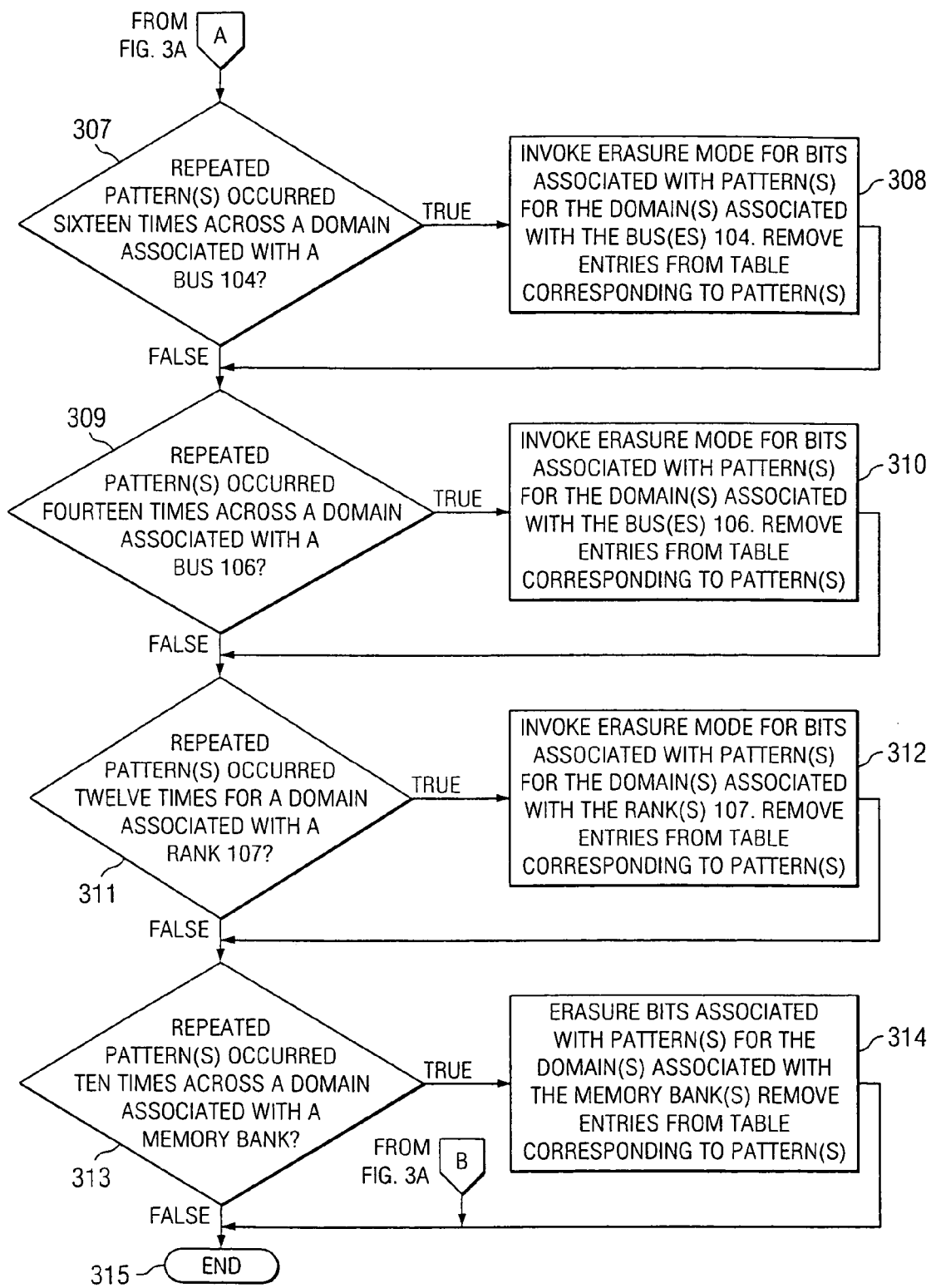

FIGS. 3A and 3B depict a flowchart for employing memory deallocation operations and erasure mode processing in response to data corruption associated with retrieval of data from memory. Portions of the flowchart may be implemented using software instructions or code within error analysis algorithm 203 (shown in FIG. 2). In step 301, data corruption is detected during retrieval of cache lines by controller 101. In step 302, error analysis algorithm 203 is executed and polls memory controller 101 for instances of data corruption. In step 303, error records 204 are updated by error analysis algorithm 203. Specifically, the occurrences of the data corruption are recorded by error analysis algorithm 203. The occurrences of data corruption as detailed in error records 204 are time-stamped or otherwise associated with suitable temporal information. Also, old records of data corruption are erased (e.g., records that are older than twenty-four hours). The purpose of erasing records according to temporal information is that the reliability of memory components is time-dependent. That is, an expected number of transient errors is related to an observation period. The determination whether observed errors are indicative of transient errors or repeatable errors is facilitated by defining a consistent observation period through appropriate deletion of old records.

In step 304, a logical comparison is made to determine whether any single physical memory location (at the bit level) exists that is associated with the ten or more errors. The number of errors selected for this logical comparison and the numbers selected for subsequence logical comparisons are based upon the capacity of memory subsystem 100. The numbers are by way of example and can be suitably modified for other memory subsystems. If the logical comparison is true, the process flow proceeds to step 305 where the page(s) containing the location(s) are deallocated. In step

306, a logical comparison is made to determine whether a repeated pattern or patterns of data corruption are reflected in error records across multiple addresses. If not, the process flow proceeds to step 315 wherein the process ends. Otherwise, the process flow proceeds to step 307.

Beginning in step 307, a plurality of threshold values are used to activate erasure mode ECC processing for the various levels of domains of memory system 100. In step 307, a logical comparison is made to determine whether any repeated patterns of data corruption have occurred across a domain associated with buses 104-1 through 104-4 at least sixteen times. If the logical comparison is false, the process flow proceeds to step 309. If true, the process flow proceeds to step 308. In step 308, the erasure mode ECC processing is invoked for the bits associated with the pattern(s) for the particular domain(s) related to the respective bus(es) 104. Specifically, register(s) of memory controller 101 may be loaded to identify the potentially corrupted bits. In response thereto, when a cache line is retrieved from an affected domain, the ECC code words are decoded by assuming that the identified bits are corrupted. Also, upon activation of the erasure mode, entries are removed from page deallocation table 205 that correspond to the bit pattern(s) of the respective memory domain(s).

In step 309, a logical comparison is made to determine whether any repeated patterns of data corruption have occurred across a domain associated with DRAM buses 106-1 through 106-8 at least fourteen times. If logical comparison is false, the process flow proceeds to step 313. If true, the process flow proceeds to step 310. In step 310, the erasure mode ECC processing is invoked for the bits associated with the pattern(s) for the particular domain(s) related to the respective DRAM bus(es) 106. Upon activation of the erasure mode, entries are removed from page deallocation table 205 that correspond to the bit pattern(s) of the respective memory domain(s).

In step 311, a logical comparison is made to determine whether any repeated patterns of data corruption have occurred across a domain associated with memory ranks 107-1 through 107-32 at least twelve times. If the logical comparison is false, the process flow proceeds to step 313. If true, the process flow proceeds to step 312. In step 312, the erasure mode ECC processing is invoked for the bits associated with the pattern(s) for the particular domain(s) related to the respective memory rank(s) 107. Upon activation of the erasure mode, entries are removed from page deallocation table 205 that correspond to the bit pattern(s) of the respective memory domain(s).

In step 313, a logical comparison is made to determine whether any repeated patterns of data corruption have occurred across a domain associated with the memory banks of memory subsystem 100 at least ten times. If the logical comparison is false, the process flow proceeds to step 315. If true, the process flow proceeds to step 314. In step 314, the erasure mode ECC processing is invoked for the bits associated with the pattern(s) for the particular domain(s) related to the respective memory bank(s). Upon activation of the erasure mode, entries are removed from page deallocation table 205 that correspond to the bit pattern(s) of the respective memory domain(s).

In step 315, the process flow ends.

Figure 4:
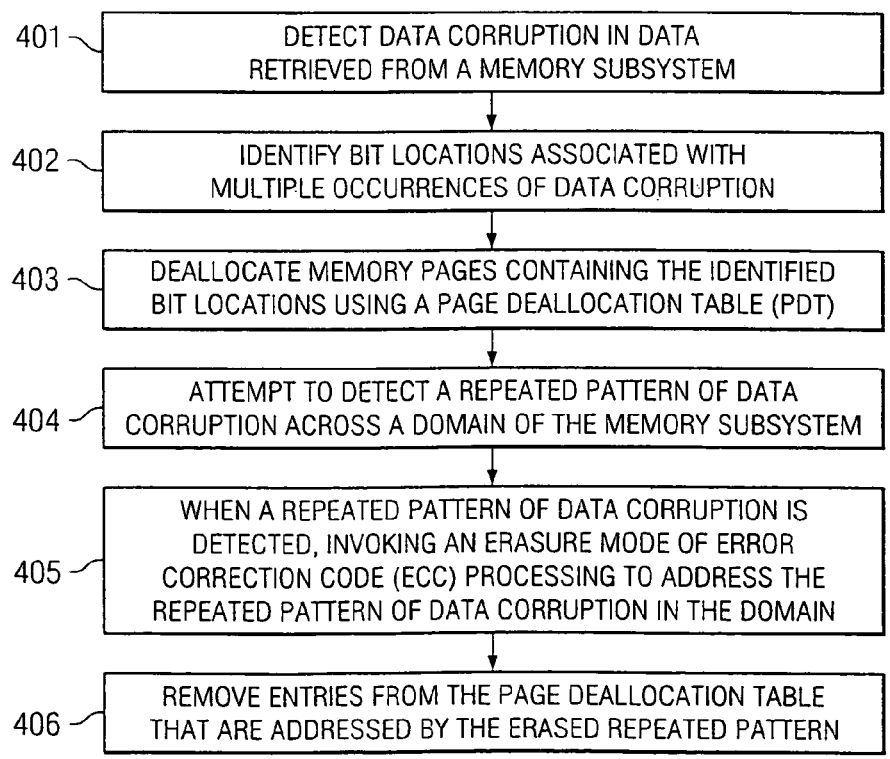
FIG. 4 depicts another flowchart for analyzing and responding to data corruption according to one representative embodiment.

FIG. 4 depicts another flowchart for analyzing and responding to data corruption according to one representative embodiment. In step 401, data corruption is detected in data retrieved from a memory subsystem. In step 402, bit locations associated with multiple occurrences of data corruption are identified. In step 403, memory pages containing the identified bit locations are deallocated using a page deallocation table (PDT). In step 404, an attempt to detect a repeated pattern of data corruption across a domain of the memory subsystem is made. In step 405, when a repeated pattern of data corruption is detected, an erasure mode of error correction code (ECC) processing is invoked to address the repeated pattern of data corruption in the domain. In step 406, entries from the PDT that are addressed by the erased repeated pattern are removed.

Some representative embodiments enable a computer system to be resilient against memory errors. By efficiently differentiating between transient errors and repeatable errors, some representative embodiments appropriately invoke page deallocation operations and erasure mode ECC processing to prevent repeatable errors from causing an unrecoverable error. Furthermore, by differentiating between isolated repeatable errors and repeatable errors associated greater ranges of addresses, some representative embodiments reduce adverse affects of page deallocation operations and erasure mode ECC processing. Specifically, system resources are not consumed by page deallocation operations. Also, system performance is not appreciably affected by invoking erasure mode ECC processing in response to transient errors or isolated repeatable errors.

What is claimed is:

1. A system comprising:
   non-volatile memory storing a page deallocation table (PDT);
   a memory controller for storing and retrieving data from a memory subsystem, said memory controller using an error correction code (ECC) algorithm to correct data corruption in retrieved data;
   a processor for executing an error analysis algorithm;
   said error analysis algorithm recording instances of data corruption in said PDT, deallocating memory regions associated with multiple occurrences of data corruption at single bit locations, said error analysis algorithm causing said memory controller to apply an erasure mode of said ECC algorithm upon detection of a repeated pattern of data corruption across different addresses of said memory subsystem, and removing entries in said PDT that correspond to data corruption addressed by application of said erasure mode.

2. The system of claim 1 wherein said ECC algorithm corrects single-byte errors in retrieved data.

3. The system of claim 1 wherein said ECC algorithm corrects an occurrence of a single-byte transient error in a cache line retrieved from said memory subsystem and, in said erasure mode, corrects an additional single-byte repeatable error corresponding to erased bits.

4. The system of claim 1 wherein said error analysis algorithm stores data in registers of said memory controller indicating bits to be erased during retrieval of data.

5. The system of claim 1 wherein said error analysis algorithm erases records of data corruption than are older than a predetermined age.

6. The system of claim 1 wherein said error analysis algorithm compares a number of occurrences of data corruption associated with said repeated pattern in a respective domain against a threshold amount before applying said erasure mode for said respective domain.

7. The system of claim 1 wherein said non-volatile memory is system firmware.

8. A method comprising:
   detecting data corruption in data retrieved from a memory subsystem;

identifying bit locations associated with multiple occurrences of data corruption;

deallocating memory pages containing said identified bit locations using a page deallocation table (PDT);

attempting to detect a repeated pattern of data corruption across a domain of said memory subsystem;

when a repeated pattern of data corruption is detected, invoking an erasure mode of error correction code (ECC) processing to address said repeated pattern of data corruption in said domain; and removing entries from said PDT that are addressed by said erased repeated pattern.

9. The method of claim 8 wherein said invoking an erasure mode comprises:

loading a register of a memory controller applying said ECC processing to identify bits associated with said repeated pattern to be erased by said memory controller.

10. The method of claim 8 further comprising:

determining a number of occurrences of data corruption associated with said domain before invoking said erasure mode.

11. The method of claim 8 wherein said PDT is stored in system firmware.

12. The method of claim 8 wherein said detecting, identifying, deallocating, attempting, invoking, and removing are performed by error analysis software stored in system firmware.

13. The method of claim 8 wherein instances of data corruption recorded in said PDT are associated with a time stamp, said method further comprising:

clearing instances of data corruption in said PDT that are older than a predetermined age.

14. The method of claim 8 wherein said ECC processing corrects single-byte errors.

15. The method of claim 8 wherein said ECC processing corrects an occurrence of a single-byte transient error in a cache line retrieved from said memory subsystem and, in said erasure mode, corrects an additional single-byte repeatable error corresponding to erased bits.

16. A system comprising:

means for recording information related to data corruption detected during retrieval of cache lines from a memory subsystem;

means for analyzing said recorded information related to said data corruption to identify multiple occurrences of data corruption at respective bit locations within said memory subsystem;

means for deallocating a memory region in response to said means for analyzing;

means for detecting a repeated pattern of data corruption across different addresses in said memory subsystem;

means for activating an erasure mode of a memory controller in response to said means for detecting; and means for clearing recorded information related to data corruption addressed by said erasure mode in response to said means for activating.

17. The system of claim 16 wherein said means for detecting determines a memory component within said memory subsystem as a cause of said repeated pattern of data corruption.

18. The system of claim 17 wherein said means for activating loads a register of a memory controller to identify bits to be erased that correspond to said repeated pattern of data corruption of cache lines retrieved from said determined memory component.

19. The system of claim 18 wherein said identified bits are determined in reference to a single-byte of a cache line retrieved from said determined memory component.

20. The system of claim 18 wherein said means for recording includes system firmware.

* * * * *

UNITED STATES PATENT AND TRADEMARK OFFICE
CERTIFICATE OF CORRECTION

PATENT NO. : 7,313,749 B2 Page 1 of 1
APPLICATION NO. : 10/879643
DATED : December 25, 2007
INVENTOR(S) : John A. Nerl et al.

It is certified that error appears in the above-identified patent and that said Letters Patent is hereby corrected as shown below:

Column 10, line 56, in Claim 5, after "corruption" delete "than" and insert -- that --, therefor.

Signed and Sealed this

Third Day of June, 2008

JON W. DUDAS
*Director of the United States Patent and Trademark Office*